United States Patent
Goetz

(10) Patent No.: US 6,313,740 B1
(45) Date of Patent: Nov. 6, 2001

(54) METHOD OF AND DEVICE FOR RETRIEVING A STOLEN VEHICLE

(76) Inventor: David Goetz, 6581 Grande Orchid Way, Del Ray Beach, FL (US) 33446

(*) Notice: Subject to any disclaimer, the term of this patent is extended or adjusted under 35 U.S.C. 154(b) by 0 days.

(21) Appl. No.: 09/649,742

(22) Filed: Aug. 28, 2000

(51) Int. Cl.[7] .................................................. B60R 25/10
(52) U.S. Cl. ................ 340/426; 340/425.5; 340/825.36; 340/825.49; 307/10.2; 342/457; 342/357.07
(58) Field of Search ................................ 340/426, 425.5, 340/988, 825.36, 825.44, 825.49, 10.1; 342/457, 357.07; 307/9.1, 10.2

(56) References Cited

U.S. PATENT DOCUMENTS

| | | | |
|---|---|---|---|
| 4,908,629 | * | 3/1990 | Apsell et al. .......................... 342/457 |
| 5,003,317 | * | 3/1991 | Gray et al. ............................ 342/457 |
| 5,513,244 | * | 4/1996 | Joao et al. .............................. 379/58 |
| 5,793,283 | * | 8/1998 | Davis ..................................... 340/426 |
| 5,805,057 | * | 9/1998 | Estaminovin .......................... 340/426 |
| 5,861,799 | * | 1/1999 | Szwed ................................. 340/425.5 |
| 5,917,423 | * | 6/1999 | Duvall ............................... 340/825.37 |
| 5,926,086 | * | 7/1999 | Escareno et al. ..................... 340/426 |
| 6,072,248 | * | 6/2000 | Muise et al. ......................... 307/10.2 |
| 6,124,805 | * | 9/2000 | Gabbard .......................... 340/825.72 |
| 6,163,251 | * | 12/2000 | Escareno et al. ..................... 340/426 |

OTHER PUBLICATIONS

Superstar Strobes—3 Professional Drop Models, 4 Flat Pack Models; Diversitronics, Inc., http://www.diversitronics.com/catalog/006.html.

Ellipsoidal Strobe Module ESM–DMX; Diversitronics, Inc., http://www.diversitronics.com/catalog/002.html.

Flat–Pack Modules; Diversitronics, Inc., http://www.diversitronics.com/catalog/006..html.

* cited by examiner

Primary Examiner—Daniel J. Wu
Assistant Examiner—Toan Pham
(74) Attorney, Agent, or Firm—Hodgson Russ LLP

(57) ABSTRACT

A method of and device for assisting in identifying and recovering a stolen vehicle is disclosed. In the method, an activation signal is sent and received at a stolen vehicle. An alerting signal is sent from the stolen vehicle in response to receiving the activation signal. The alerting signal is received, and an identification signal is sent in response to receiving the alerting signal. The identification signal is received at the stolen vehicle, and an identification device on the vehicle is activated in response to receiving the identification signal. In a method according to the present invention, a control signal is also sent to and received by the stolen vehicle. A control system of the stolen vehicle is operated via the control signal to bring the stolen vehicle to a safe stop.

34 Claims, 12 Drawing Sheets

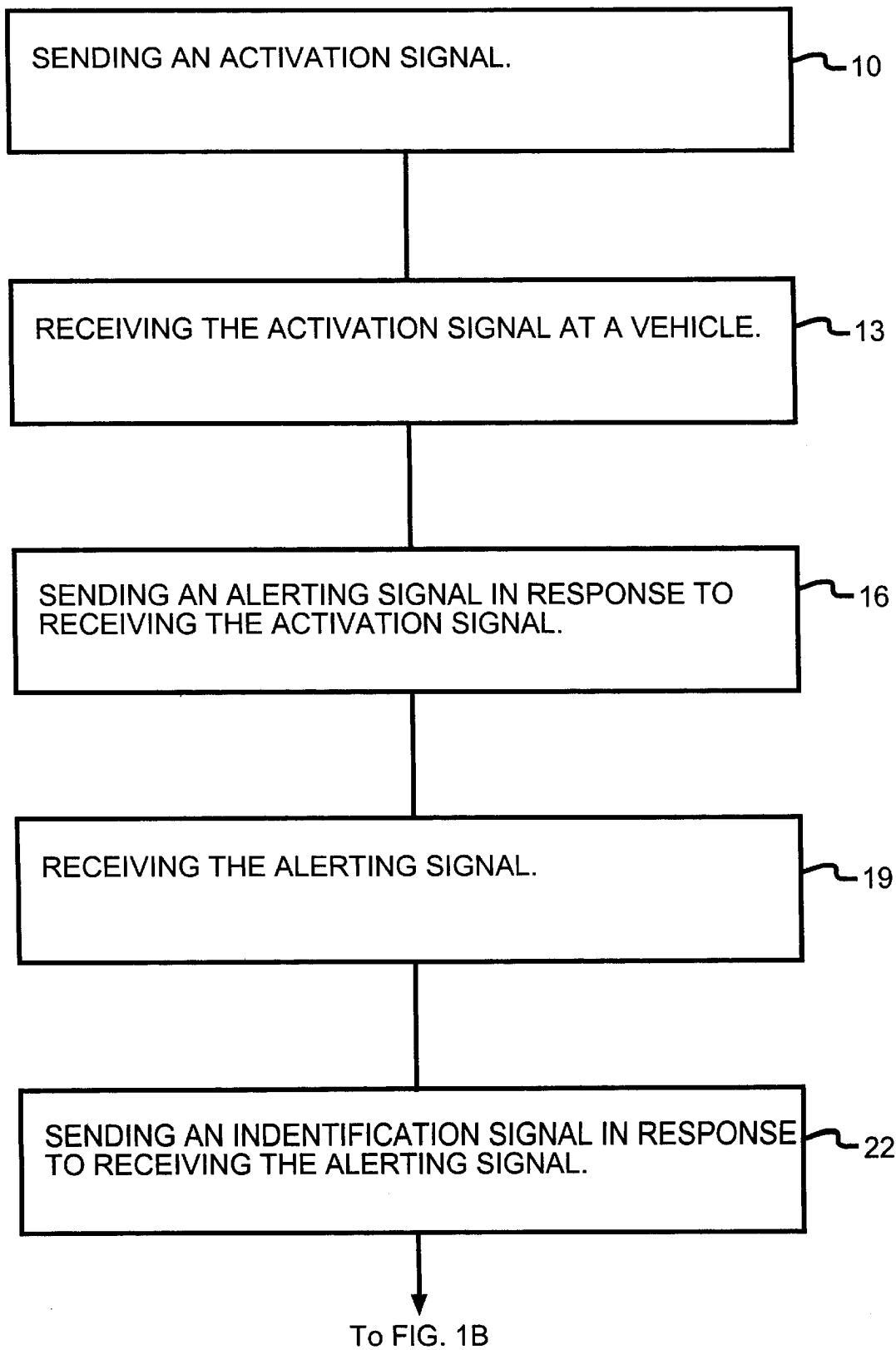

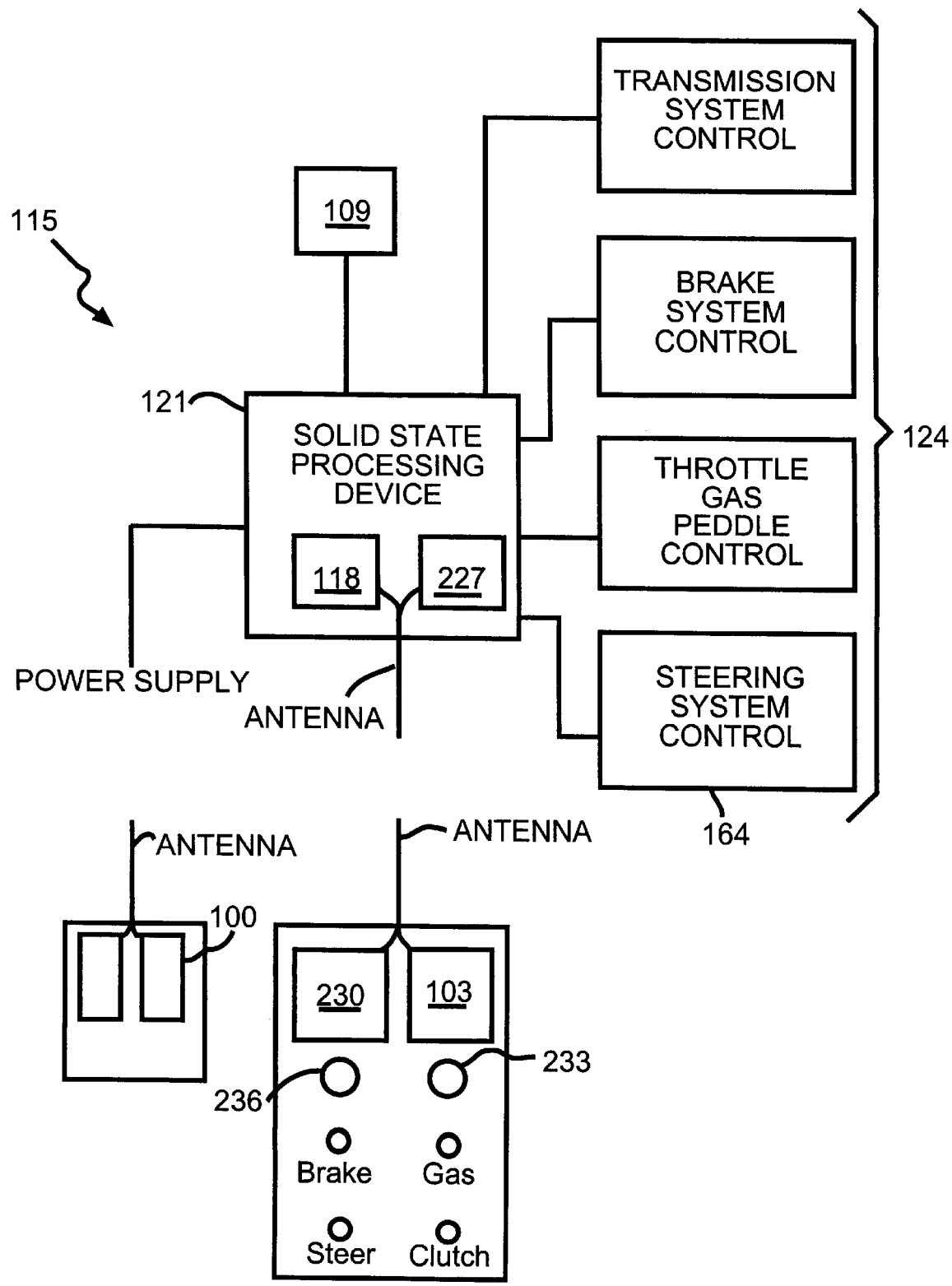

METHOD OF AND DEVICE FOR RETRIEVING A STOLEN VEHICLE

BACKGROUND OF THE INVENTION

1. Field of the Invention

The present invention relates generally to devices and methods of identifying and recovering stolen vehicles.

2. Discussion of Related Art

In the prior art, there are devices for recovering stolen vehicles. In one such device, a radio signal arms a device on a stolen vehicle. Once armed, the device emits a signal that can be received by a police car having a signal receiver. The signal receiver provides the police officer in the police car with the direction and location of the stolen vehicle, relative to the police car. A description and license plate number of the stolen vehicle are also provided to the police officer. To retrieve the stolen vehicle, the officer must follow the signal from the device, which may be miles away. If the appearance and license plate of the stolen vehicle have not been changed, it may be possible to locate the stolen vehicle. However, such systems do not positively identify and then allow control of the stolen vehicle.

Another prior art system uses a global positioning satellite to locate a vehicle on a map. In one model of such a system, the company that tracks the location of the vehicle can lock the doors and turn off the vehicle's engine. Such systems are expensive and do not allow police to identify and then control the stolen vehicle.

SUMMARY OF THE INVENTION

Accordingly, it is an object of the present invention to provide a method and a system for assisting in the identification and recovery of stolen vehicles.

The foregoing objectives are realized by the present invention, which includes a method of assisting in the recovery of a stolen vehicle. In the method, an activation signal is sent and received at a stolen vehicle. An alerting signal is sent from the stolen vehicle in response to receiving the activation signal. The alerting signal is received, and an identification signal is sent in response to receiving the alerting signal. The identification signal is received at the stolen vehicle, and an identification device on the vehicle is activated in response to receiving the identification signal.

In a preferred method, a control signal is also sent to and received by the stolen vehicle. A control system of the stolen vehicle is operated via the control signal to bring the stolen vehicle to a safe stop.

A system according to the present invention includes a first transmitter capable of sending an activation signal, and a second transmitter capable of sending an identification signal. A vehicle is equipped with a recovery system including a receiver, an activator, and an identification device. The receiver is capable of receiving the activation signal, and the activator is capable of allowing the receiver to receive the identification signal in response to receipt of the activation signal by the receiver. The activator is also capable of activating the identification device in response to receipt of the identification signal.

Other objects and advantages of the present invention will become apparent to those skilled in the art from the following detailed description read in conjunction with the attached drawings and claims appended hereto.

BRIEF DESCRIPTION OF THE DRAWINGS

For a fuller understanding of the nature and objects of the invention, reference should be made to the following detailed description taken in conjunction with the accompanying drawings, in which:

FIGS. 1a and 1b are flow charts describing an embodiment of a method according to the present invention;

FIG. 2 is a schematic showing a system according to the present invention;

BEST MODE FOR CARRYING OUT THE INVENTION

Figure 1B:
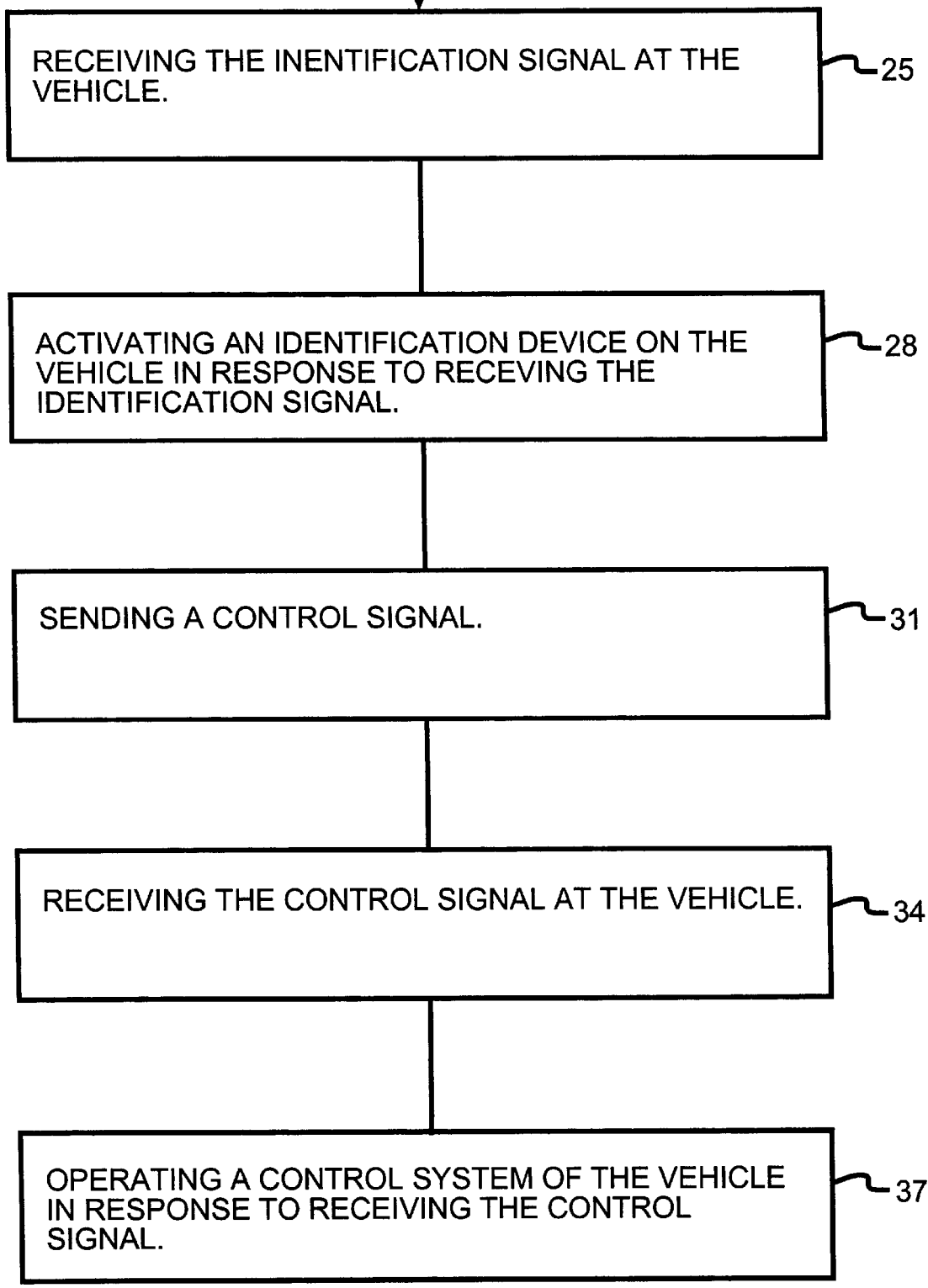

FIGS. 1A and 1B show steps of a method according to the present invention. In the method, an activation signal is sent (step 10). For example, the owner of a stolen vehicle calls the police to report the stolen vehicle, and the police, or another organization notified by the police, send the activation signal (step 10). All of the signals described herein are preferably, but not necessarily, electromagnetic signals, unless otherwise noted.

Once the activation signal is received (step 13) at the vehicle, an alerting signal is sent (step 16). In a preferred embodiment, the alerting signal continues to be sent (step 16) in order to let the police know the stolen vehicle is nearby. The alerting signal may be received (step 19) at a moving vehicle, such as a patrol vehicle having a police officer therein, or the alerting signal may be received (step 19) at a stationary location, such as a guard house associated with an entrance/exit gate of a facility, or both. In a preferred embodiment of the present invention, the alerting signal is received (step 19) and made known to individuals within a patrol vehicle when the alerting signal is sent from a location within a pre-determined distance of the patrol vehicle. In this manner individuals in patrol vehicles may focus recovery efforts on areas normally patrolled by the individuals, and may focus recovery efforts on vehicles within a reasonable distance from the patrol vehicle.

Once the alerting signal is received (step 19), an identification signal is sent (step 22) to the vehicle. Upon receipt of the identification signal (step 25) at the vehicle, an identification device on the vehicle is activated (step 28). The identification device may be a light or noise generator that will assist the police in identifying the particular vehicle that received the identification signal.

Once the vehicle of interest is identified, a control signal is sent (step 31) to and received (step 34) by the vehicle. The control signal may be an electromagnetic signal, but may also be another type of signal, such as a sonic signal, such as the "yelp" of a police vehicle siren, or an ultrasonic signal. Using the control signal, a control system of the vehicle is operated (step 37). For example, the control system may be a fuel regulation system, and operating the control system (step 37) of the vehicle includes reducing a fuel supply rate. As the fuel supply rate is reduced, the vehicle's engine delivers less power until ultimately, the engine stalls or is merely idling. Preferably, the engine is allowed to idle so that other systems, such as the steering system, remain operable.

The control system may be a brake system, and in that case, operating the control system (step 37) of the vehicle includes causing the brake system to slow the vehicle. For example, a brake pedal of the vehicle is operated so that the brakes exert a force to slow the vehicle. In another embodiment, the control system is a power transmission system, and operating the control system (step 37) of the vehicle includes reducing power transmitted from an engine of the vehicle. For example, a clutch pedal of the vehicle is operated so that the engine no longer delivers power to the wheels, propeller or other vehicle propulsion device.

In yet another embodiment, the control system is a direction control system, and operating the control system (step 37) of the vehicle includes steering. For example, a gear having a motor attached is engaged with the rack of a rack and pinion steering system corresponding to the stolen vehicle, and upon receiving the control signal, the motor causes the gear to turn, thereby steering the vehicle.

It should be noted that more than one control system of the vehicle may be operated (step 37) via the control signal. For example, the police may send a control signal (step 31) that not only reduces the fuel supply rate, but also brakes and steers the vehicle. In this fashion, the police can guide the vehicle to a safe place where the vehicle is stopped and where the person inside can be safely arrested.

A system for carrying out the method described above is illustrated in FIGS. 2 through 12. A preferred system shown in FIG. 2 includes a first transmitter 100 capable of sending the activation signal and a second transmitter 103 capable of sending the identification signal. The second transmitter 103 may be located in a patrol vehicle 106, shown in FIG. 3, such as a police car, police boat or police aircraft. Other locations are possible, including stationary locations such as a guard house associated with an entrance/exit gate of a facility. By locating the second transmitter 103 in the patrol vehicle 106, police officers can activate an identification device 109 and then follow the stolen vehicle 112.

The stolen vehicle 112 has thereon a recovery system 115 having a receiver 118, an activator 121, and the identification device 109. See FIG. 2. The receiver 118 is capable of receiving the activation signal. The activator 121 is capable of allowing the receiver 118 to receive the identification signal, in response to receipt of the activation signal, and is capable of activating the identification device 109, in response to receipt of the identification signal.

The recovery system 115 may include a control device 124, and the second transmitter 103 may be capable of sending the control signal. In an embodiment, the activator 121 is further capable of receiving the control signal and activating the control device 124 in response to receipt of the control signal. The control device 124 allows the police officers to control the stolen vehicle 112, as for example, by activating the brakes of the stolen vehicle 112 to slow the vehicle 112, reducing the rate at which fuel is supplied to the stolen vehicle's engine, operating a clutch of the vehicle 112 to disengage the engine, or by steering the vehicle 112. The control device 124 may be located in the cockpit of the vehicle 112, or may be located in the engine compartment of the vehicle 112. Several control devices 124 located in the cockpit of the vehicle 112 are described below in more detail.

For those control systems normally operated by a foot pedal 127 (see FIGS. 4–9), the control device 124 may include an electromagnet 130 and a corresponding magnetic block 133, one of which is mounted on linkage 136 connected to the foot pedal 127. When the electromagnet 130 is activated in response to the receiving control signal, the foot pedal 127 is caused to move. For example, in the case of a pedal 127 for operating the brakes or a clutch of the vehicle 112, the electromagnet 130 pulls on the magnetic block 133 mounted on the floor board 139 and fire wall 142 of the stolen vehicle 112 thereby forcing the pedal 127 toward the floor board 139 of the vehicle 112. If the pedal 127 is the gas pedal, then the electromagnet 130 pushes on the magnetic block 133 mounted on the floor board 139 and fire wall 142 of the stolen vehicle 112 to force the gas pedal away from the floor board 139 of the vehicle 112.

In an embodiment of the present invention, a housing 145 is placed around the magnetic block 133 and the electromagnet 130 to prevent objects from occupying the space between the magnetic block 133 and the electromagnet 130. The housing 145 assures a clear path so that the magnetic block 133 and the electromagnet 130 can be drawn toward each other or forced away from each other, as the case may be.

Figure 7:
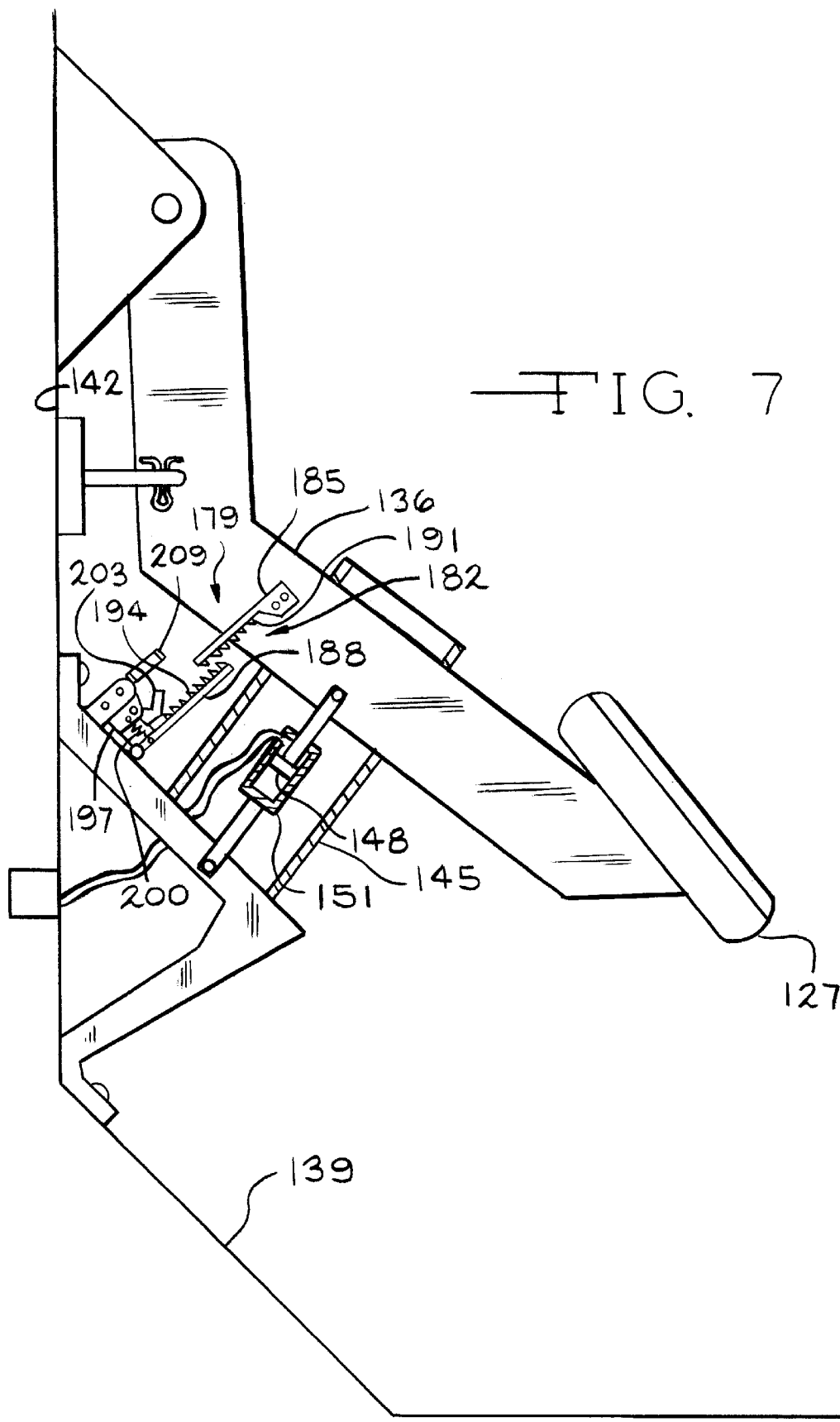
FIG. 7 is a side view of a foot pedal of a stolen vehicle, modified according to the present invention.
Figure 8:
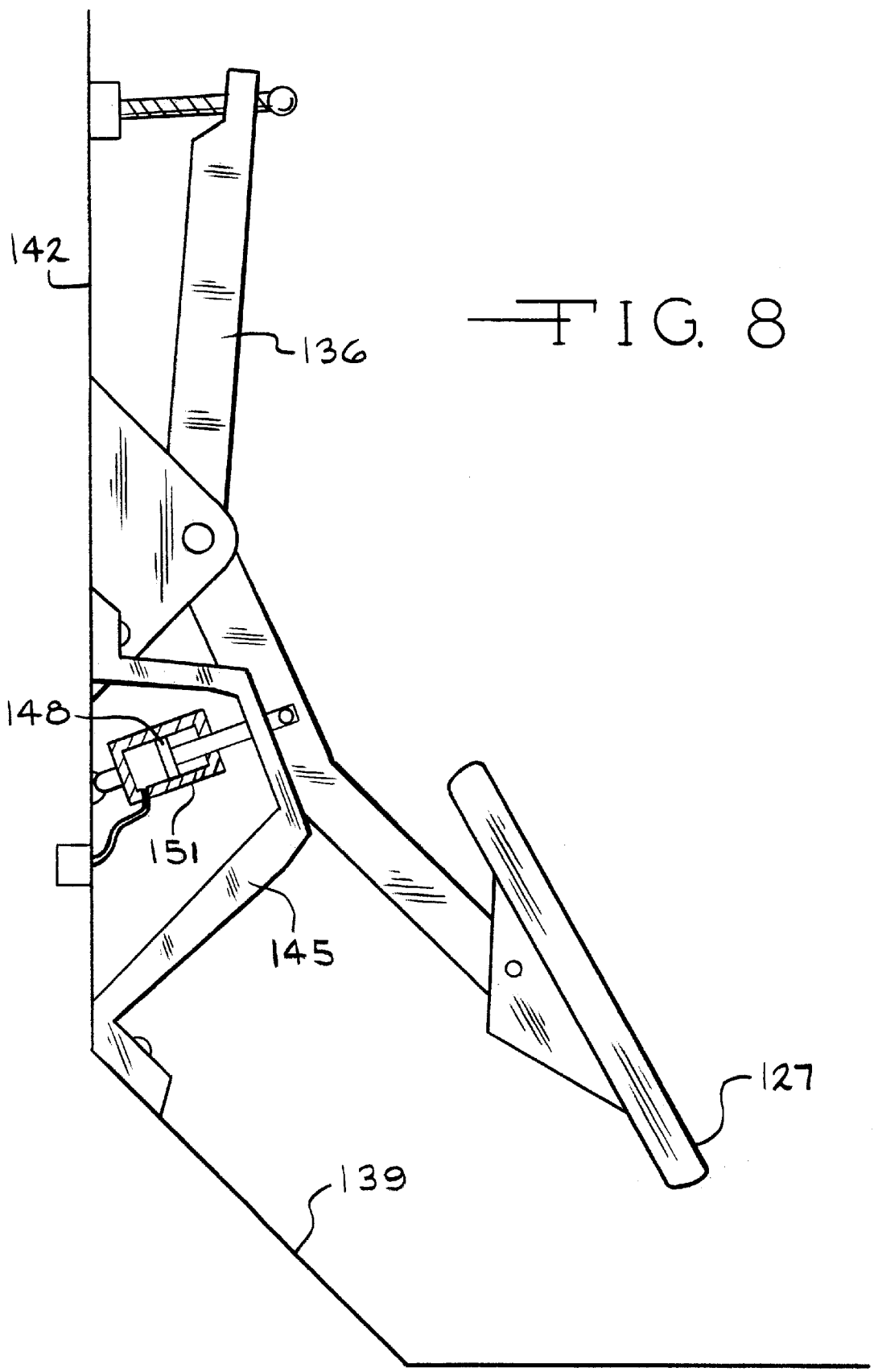
FIG. 8 is a side view of a foot pedal of a stolen vehicle, modified according to the present invention.

In lieu of an electromagnet 130 and magnetic block 133, the control device 124 may be a piston 148 and cylinder 151 combination, shown in FIG. 7. When the control signal is received, the pressure inside the cylinder 151 is increased to pull or push, as the case may be, the piston 148. For example, the piston 148 may be connected to the brake pedal and the cylinder 151 may be fixed to the floor board 139 and fire wall 142 of the vehicle 112, and when the pressure in the cylinder 151 is increased, the piston 148 is drawn toward the floor board 139 to apply the brakes and slow the stolen vehicle 112. Of course, this same type of piston 148 and cylinder 151 combination may be used to operate the gas pedal, as shown in FIG. 8, and clutch pedal too.

Figure 9:
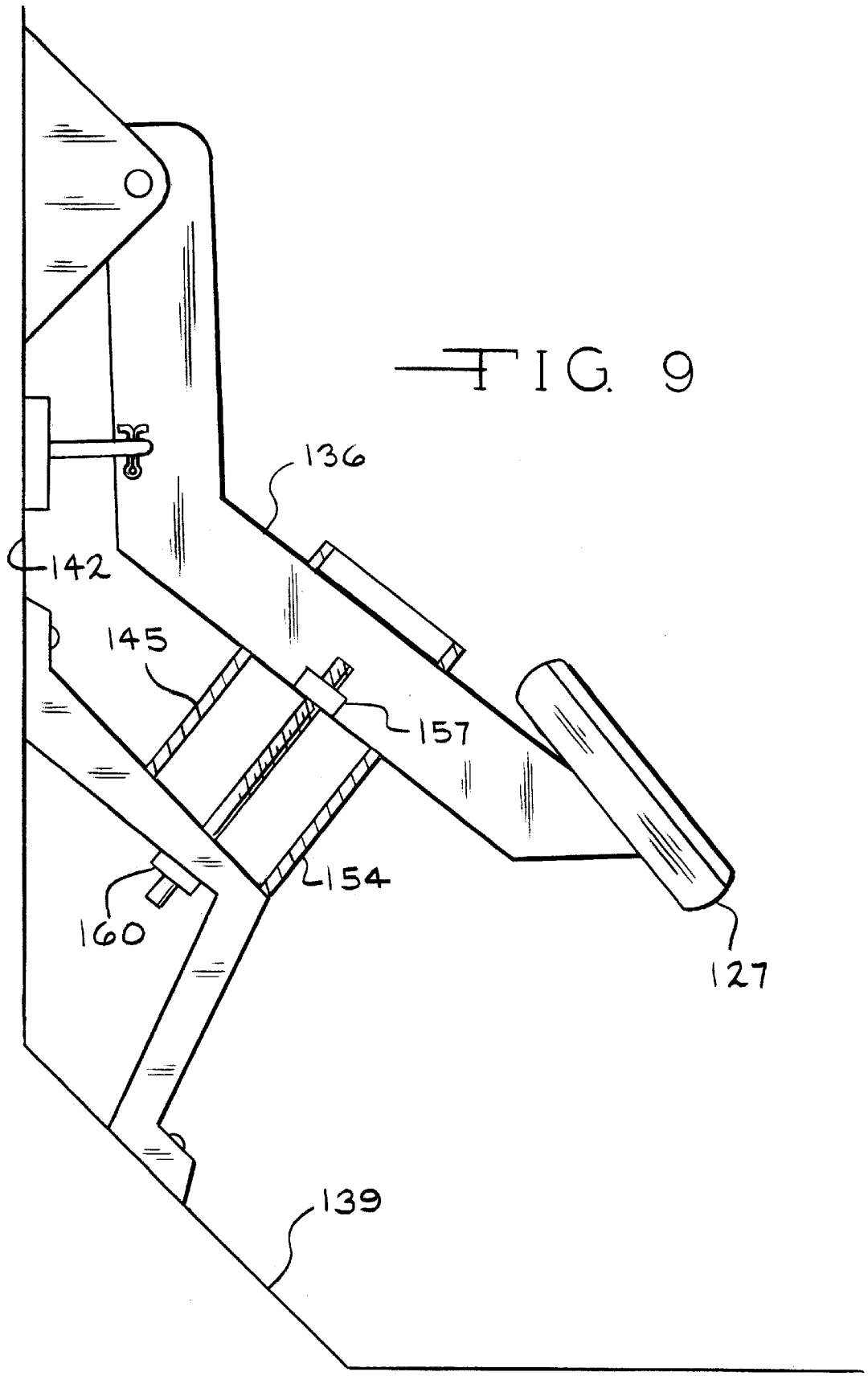
FIG. 9 is a side view of a foot pedal of a stolen vehicle, modified according to the present invention.

In yet another embodiment of the control device 124, an externally threaded rod 154 is threaded with an internally threaded block 157, as shown in FIG. 9. Either the threaded block 157 or the rod 154 is connected to the linkage 136 connected to the foot pedal 127, for example the brake pedal, and the other is connected to a motor 160, that is in turn fixed to the floor board 139 and fire wall 142 of the vehicle 112. When the motor 160 is activated in response to the control signal, the motor 160 causes the threaded rod 154 to rotate relative to the threaded block 157, and the pedal 127 is driven toward or away from the floor board 139, as the case may be. Of course, this same type of threaded rod 154 and threaded block 157 may be used to operate the gas pedal and clutch pedal too.

Figure 10:
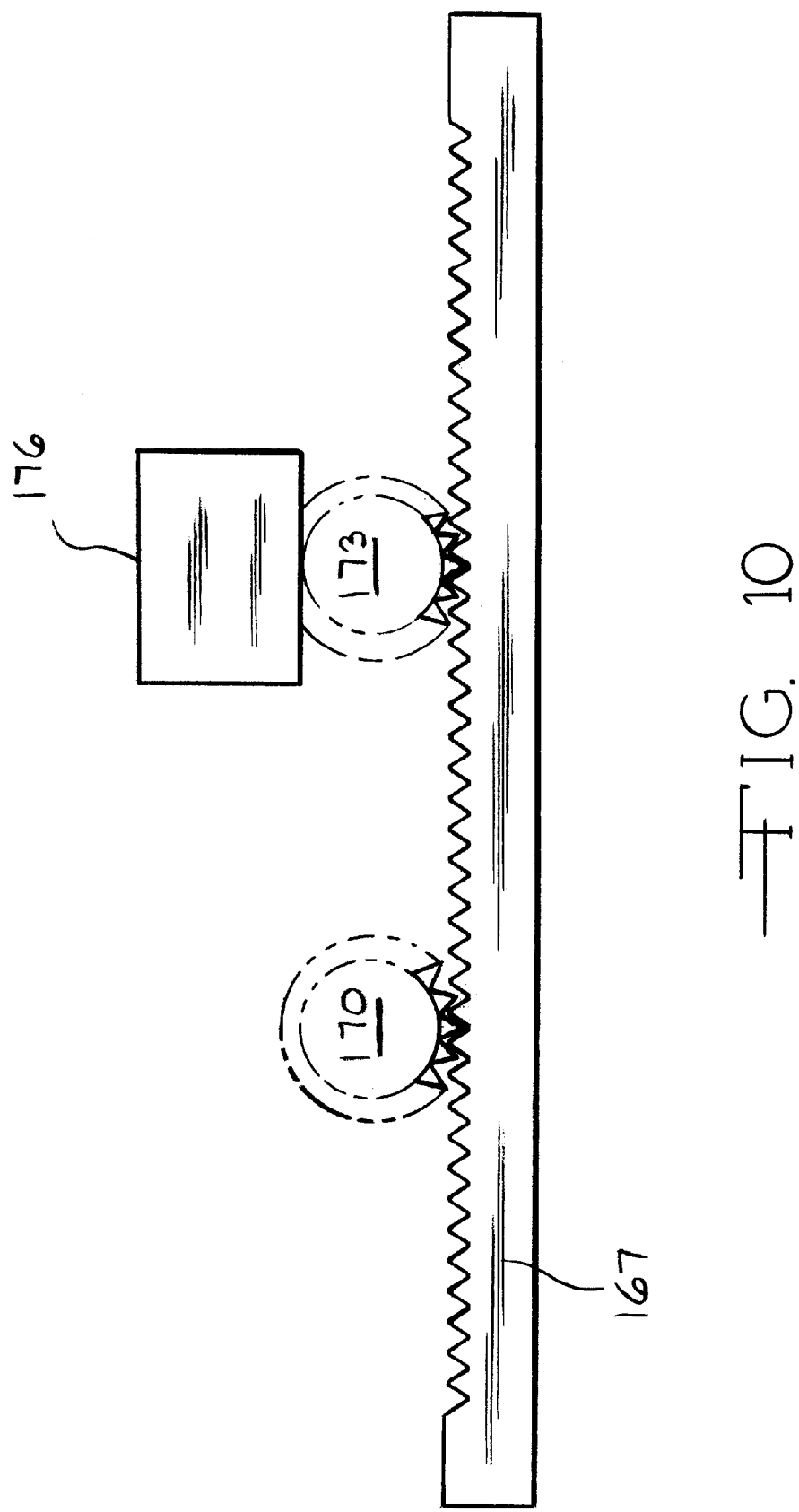
FIG. 10 is a rack and pinion of a stolen vehicle modified according to the present invention.
Figure 11:
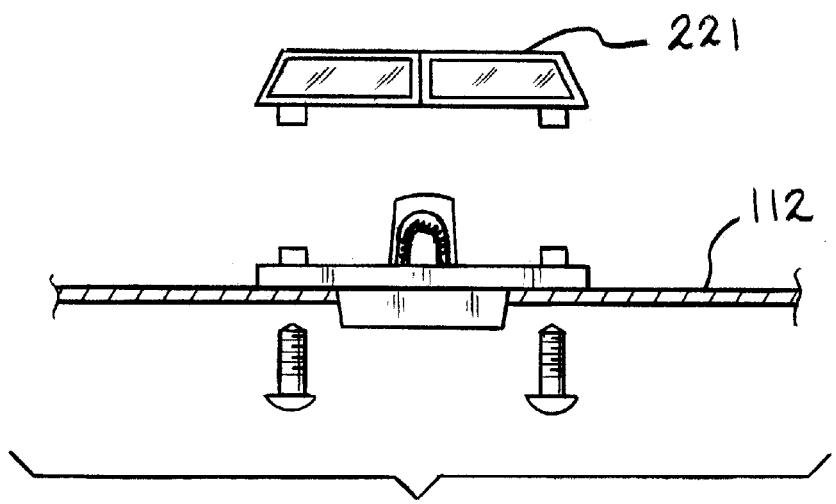
FIG. 11 is side view of a housing according to the present invention.
Figure 12:
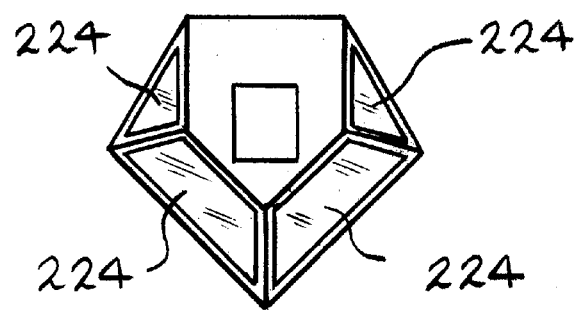
FIG. 12 is a top view of the housing shown in FIG. 11.

As noted above, the control device 124 may include a mechanism connected to a steering system 164 of the vehicle 112 and is capable of controlling a direction of vehicle travel. As shown in FIG. 10, if the steering system 164 includes a rack 167 and pinion 170, an additional pinion 173 may be engaged with the rack 167 and connected to a drive motor 176. When the control signal is received, the drive motor 176 turns the additional pinion 173 to cause the rack 167 to move, thereby steering the stolen vehicle 112.

The present invention may further include a means for locking progress 179 of the control device 124. Once the control device 124 begins controlling the stolen vehicle 112, a person in the stolen vehicle 112 may try to overcome the control device 124, for example, by pulling or pushing against one or more of the foot pedals 127 being moved by the control device 124. To prevent the person from succeeding, a ratchet system 182 may be provided that permits movement of the pedal linkage 136 in only one direction. In one embodiment of the present invention shown in FIG. 7, upon receiving the control signal, a first ratchet 185 attached to the pedal linkage 136 is engaged with a corresponding second ratchet 188 attached to the floor board 139 and fire wall 142 of the vehicle 112. As the control device 124 moves the pedal 127, the teeth 191 of the first ratchet 185 slide over the teeth 194 of the second ratchet 188, but if the person inside the stolen vehicle 112 tries to manipulate the pedal 127 in a direction opposite to the control device's 124 progress, the teeth 191 of the first ratchet 185 and the teeth 194 of the second ratchet 188 prevent the full force exerted by the person from being transmitted to the control device 124.

A means of providing selective engagement of the first ratchet 185 with the second ratchet 188, involves mounting the second ratchet 188 on a track 197. The second ratchet 188 is biased toward the first ratchet 185 by a spring 200. A pivotable magnetic block 203 is inserted between the second ratchet 188 and a mounting base 206 to hold the second ratchet 188 away from the first ratchet 185. An electromagnet 209 is provided that is activated once the control signal is received at the stolen vehicle 112. The electromagnet 209 causes the pivotable block 203 to move away from the second ratchet 188 and the spring 200 pulls the second ratchet 188 toward the first ratchet 185 so that the teeth 191 of the first ratchet 185 engage the teeth 194 of the second ratchet 188. In this manner, the first and second ratchets 185, 188 are not engaged during normal operation of the vehicle 112, but are selectively engaged upon receipt of the control signal.

Figure 3:
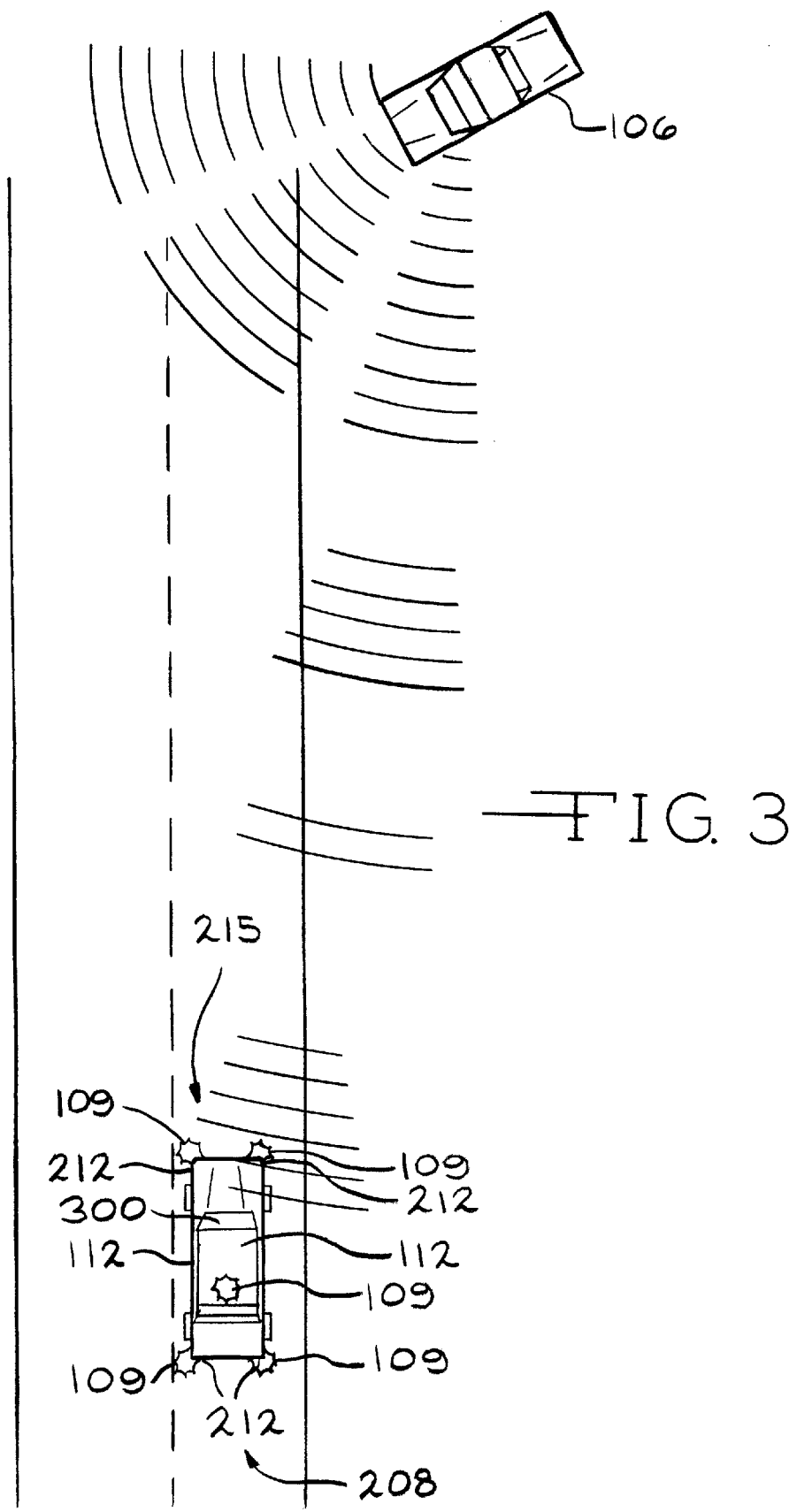
FIG. 3 shows a stolen vehicle and a patrol vehicle according to the present invention.
Figure 4:
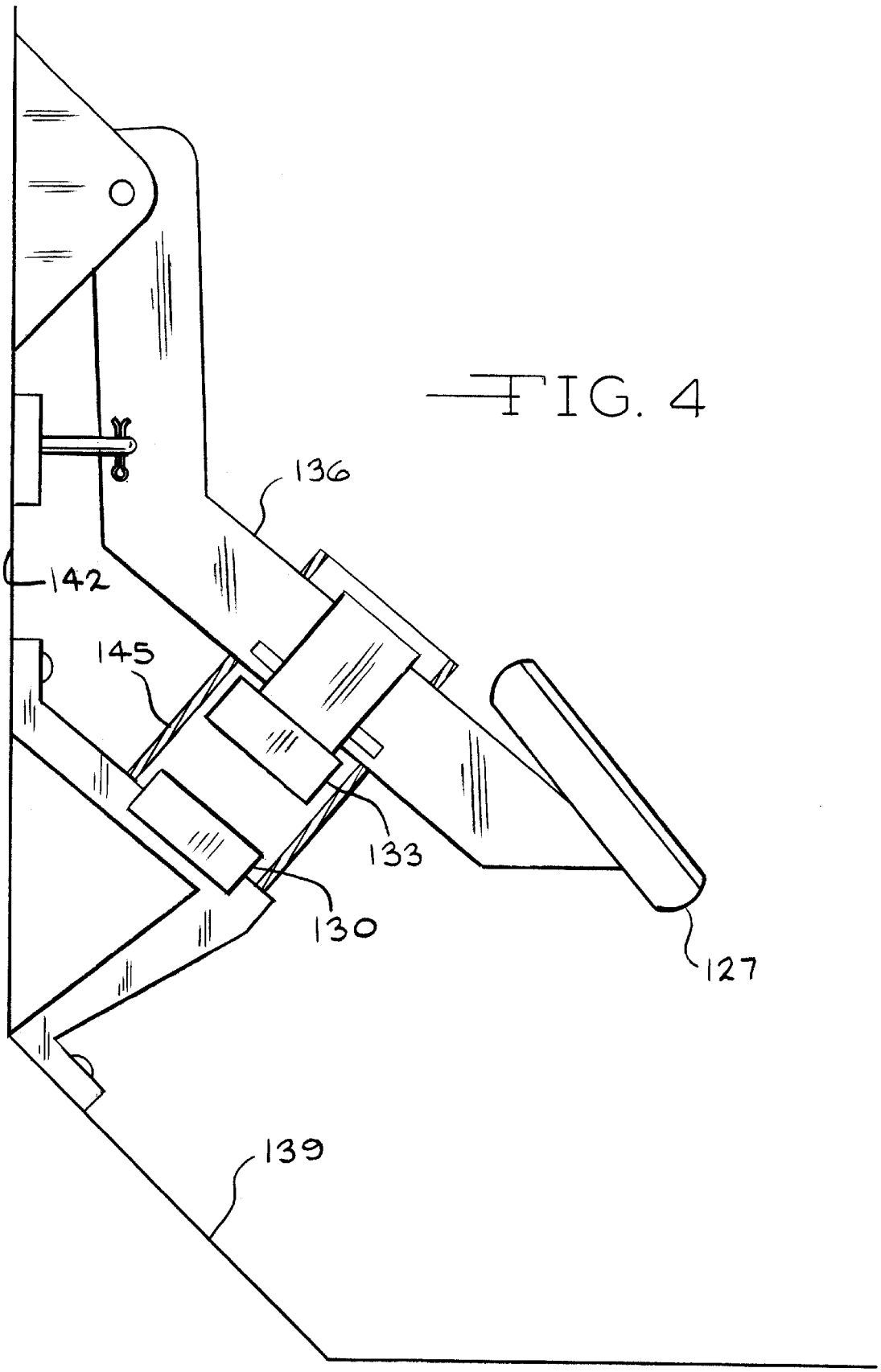
FIG. 4 is a side view of a foot pedal of a stolen vehicle, modified according to the present invention.
Figure 5:
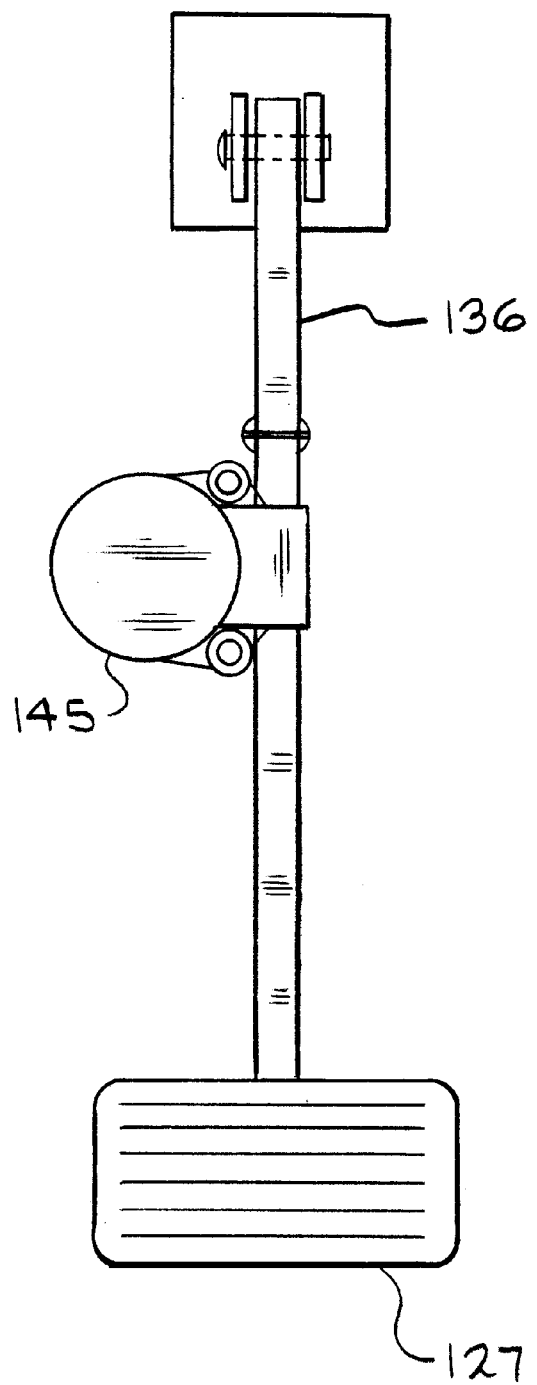
FIG. 5 is a top view of the foot pedal shown in FIG. 4.
Figure 6:
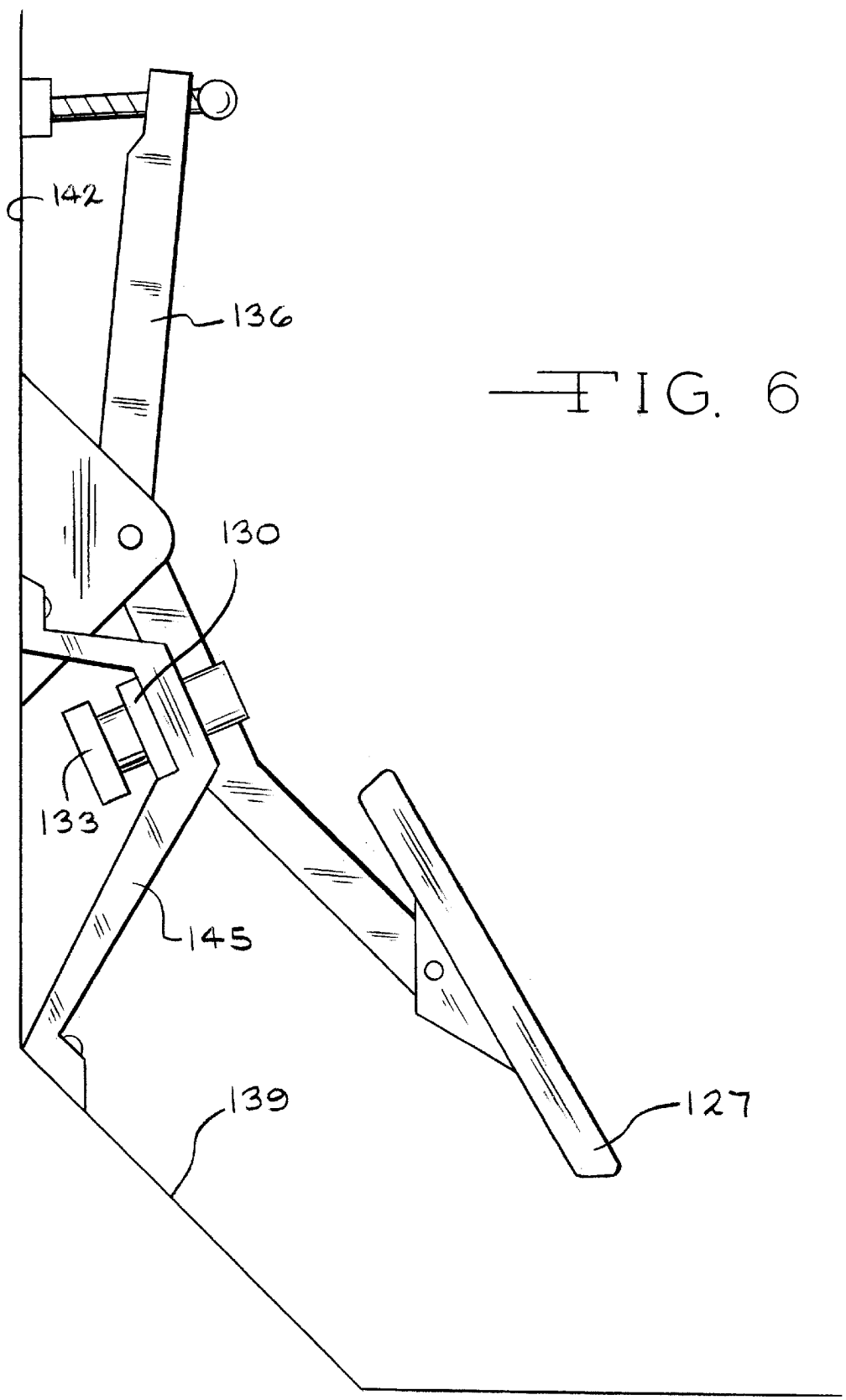
FIG. 6 is a side view of a foot pedal of a stolen vehicle, modified according to the present invention.

As shown in FIG. 3, the turn signals 212 of the vehicle 112 may be used as the identification device 109. In an embodiment of the present invention, the identification device 109 is a strobe light. Such a strobe light may be mounted on front 215 and a back 218 portions of the stolen vehicle 112 so police officers can determine which of several vehicles is the stolen vehicle 112. The strobe may also be mounted on the bottom of the vehicle 112. The strobe light may also be mounted on the exterior side of the vehicle's 112 roof. When mounted on the vehicle's 112 roof, it is preferred that the strobe light be covered by a housing 221 having translucent sides 224 so the strobe can be seen from the left and right sides of the vehicle 112, as well as from behind the vehicle 112, but not from the front of the vehicle 112. Such a housing 221 will reduce the chance the driver will notice the strobe light when the strobe light is flashing. If the police officer desires to determine which of many vehicles is the stolen vehicle 112, the police officer causes the identification signal to be sent in order to activate the identification device 109 on the stolen vehicle 112. Once, the police officer knows where the stolen vehicle 112 is, the police officer can send the control signal, bring the stolen vehicle 112 to a safe stop, and then apprehend the person inside the stolen vehicle 112.

The recovery system may include an alerting signal transmitter 227 (shown in FIG. 2) capable of sending the alerting signal in response to receiving the activation signal. Using this embodiment of the invention, upon receiving the activation signal, the alerting signal transmitter 227 is turned on and constantly, or frequently, sends the alerting signal. An alerting signal receiver 230 in the patrol vehicle 106 is turned on by a police officer and left on throughout the police officer's work day. In this manner, if the patrol vehicle 106 comes within the range of the alerting signal, the alerting signal receiver 230 will receive the alerting signal, and the officer will be alerted by an alerting indication device 233 that a stolen vehicle 112 is in the vicinity. The alerting indication device 233 may be a light or a sound generator.

The alerting signal receiver 230 may further include a range adjustor 236 so that only those alerting signals being sent from stolen vehicles 112 in the immediate vicinity are detected. For example, the range adjustor 236 may be a device for changing the threshold corresponding to the alerting signal strength required to activate the alerting indication device 233.

In another embodiment of the present invention, the recovery system 115 includes a panic switch 300 located in the trunk or the cockpit of the vehicle 112, or both. When activated, the panic switch sends a car jacking signal, for example to the police. Activating the panic switch 300 may activate the activator 121 and the control device 124. The stolen vehicle 112 can then be identified and recovered as described above. The panic switch 300 is particularly helpful in situations where the owner of the vehicle 112 is in or near the vehicle 112 when a car thief attempts to gain possession of the vehicle 112. In such a situation, the owner flips the panic switch 300 and then leaves the vehicle 112. In doing so, the police will be notified immediately that the vehicle 112 has been stolen.

It should be noted that although the present invention has been described herein as being used in conjunction with the police, other organizations may use the present invention.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A system for assisting in recovering a vehicle, comprising:
   a first transmitter capable of sending an activation signal;
   a second transmitter capable of sending an identification signal;
   a vehicle having a recovery system including a receiver, an activator, and an identification device, the receiver being capable of receiving the activation signal, and the activator being capable of allowing the receiver to receive the identification signal in response to receipt of the activation signal by the receiver, and capable of activating the identification device in response to receipt of the identification signal.

2. The system of claim 1, wherein the identification device is a light.

3. The system of claim 1, wherein the system further includes a control device, and the second transmitter is further capable of sending a control signal, and the receiver is further capable of receiving the control signal, and the activator is further capable of activating the control device in response to receipt of the control signal.

4. The system of claim 3, wherein the control device includes a vehicle brake activator.

5. The system of claim 4, wherein the brake activator includes a magnet positioned to operate a braking system of the vehicle.

6. The system of claim 4, wherein the brake activator includes a piston and a cylinder combination connected to a braking system of the vehicle.

7. The system of claim 4, wherein the brake activator includes an externally threaded rod, and includes an internally threaded block engaging the threads of the rod and connected to a braking system of the vehicle, and includes a motor connected to the rod and capable of turning the rod to cause the block to move.

8. The system of claim 4, wherein the brake activator includes an externally threaded rod connected to a braking system of the vehicle, and includes an internally threaded block engaging the threads of the rod and connected to a motor capable of turning the block to cause the rod to move.

9. The system of claim 3, wherein the control device includes a vehicle fuel controller.

10. The system of claim 9, wherein the vehicle fuel controller includes a magnet positioned to operate a fuel regulator of a fuel supply system of the vehicle.

11. The system of claim 9, wherein the vehicle fuel controller includes a piston and cylinder combination connected to a fuel regulator of a fuel supply system of the vehicle.

12. The system of claim 9, wherein the vehicle fuel controller includes a n externally threaded rod, and includes an internally threaded block engaging the threads of the rod and connected to a fuel regulator of a fuel supply system of the vehicle, and includes a motor connected to the rod and capable of turning the rod to cause the block and the fuel regulator to move.

13. The system of claim 9, wherein the vehicle fuel controller includes an externally threaded rod connected to a fuel regulator of a fuel supply system of the vehicle, and includes an internally threaded block engaging the threads of the rod and connected to a motor capable of turning the block to cause the rod and the fuel regulator to move.

14. The system of claim 3, wherein the control device includes a transmission controller.

15. The system of claim 14, wherein the transmission controller includes a magnet positioned to manipulate a clutch of the vehicle.

16. The system of claim 14, wherein the transmission controller includes a piston and cylinder combination connected to a clutch of the vehicle.

17. The system of claim 14, wherein the transmission controller includes an externally threaded rod, and includes an internally threaded block engaging the threads of the rod and connected to a clutch of a transmission system of the vehicle, and includes a motor connected to the rod and capable of turning the rod to cause the block and the clutch to move.

18. The system of claim 14 wherein the transmission controller includes an externally threaded rod connected to a clutch of a transmission system of the vehicle, and includes an internally threaded block engaging the threads of the rod and connected to a motor capable of turning the block to cause the rod and the clutch pedal to move.

19. The system of claim 3, wherein the control device is connected to a foot pedal linkage of the vehicle, and is capable of moving the linkage to slow the vehicle in response to receipt of the control signal.

20. The system of claim 3, wherein the control device is connected to a steering system of the vehicle and is capable of controlling a direction of travel of the vehicle.

21. The system of claim 19, further comprising a ratchet preventing movement of the foot pedal linkage in one direction.

22. The system of claim 1, wherein the vehicle further includes an alerting signal transmitter capable of sending an alerting signal in response to receiving the activation signal, and the activator further includes an alerting indication device and an alerting signal receiver capable of receiving the alerting signal, and wherein the alerting indication device is capable of being activated when the alerting signal is received by the alerting signal receiver.

23. The system of claim 21, wherein the alerting indication device includes a light.

24. The system of claim 21, wherein the alerting indication device includes a sound generator.

25. The system of claim 21, further comprising an adjustor for selectively adjusting a threshold, the threshold corresponding to the alerting signal strength required to activate the alerting indication device.

26. A system for assisting in recovering a vehicle, comprising:

a transmitter capable of sending an identification signal;

a vehicle having a recovery system including a panic switch, a receiver, an activator, and an identification device, the panic switch being capable of activating the receiver, the receiver being capable of receiving the identification signal in response to activation of the panic switch, and the activator being capable of activating the identification device in response to receipt of the identification signal by the receiver.

27. The system of claim 26, wherein the system further includes a control device, and the transmitter is further capable of sending a control signal, and the receiver is further capable of receiving the control signal, and the activator is further capable of activating the control device in response to receipt of the control signal.

28. A method of assisting in recovering a stolen vehicle, comprising:

sending an activation signal;

receiving the activation signal at a vehicle;

sending an alerting signal in response to receiving the activation signal;

receiving the alerting signal;

sending an identification signal in response to receiving the alerting signal;

receiving the identification signal at the vehicle;

activating an identification device on the vehicle in response to receiving the identification signal.

29. The method of claim 28, further comprising:

sending a control signal;

receiving the control signal at the vehicle;

operating a control system of the vehicle in response to receiving the control signal.

30. The method of claim 29, wherein the control system is a fuel regulation system, and operating the control system of the vehicle includes reducing a fuel supply rate.

31. The method of claim 29, wherein the control system is a brake system, and operating the control system of the vehicle includes causing the brake system to reduce the speed of the vehicle.

32. The method of claim 29, wherein the control system is a power transmission system, and operating the control system of the vehicle includes reducing power transmitted from an engine of the vehicle.

33. The method of claim 29, wherein the control system is a direction control system, and operating the control system of the vehicle includes steering.

34. The method of claim 28, further comprising indicating receipt of the alerting signal when the alerting signal is sent from a location within a pre-determined distance of a device receiving the alerting signal.

* * * * *